Jan. 2, 1940.  A. E. SPICER  2,185,756
MULTIPLE CELL DRY BATTERY
Filed Sept. 19, 1938
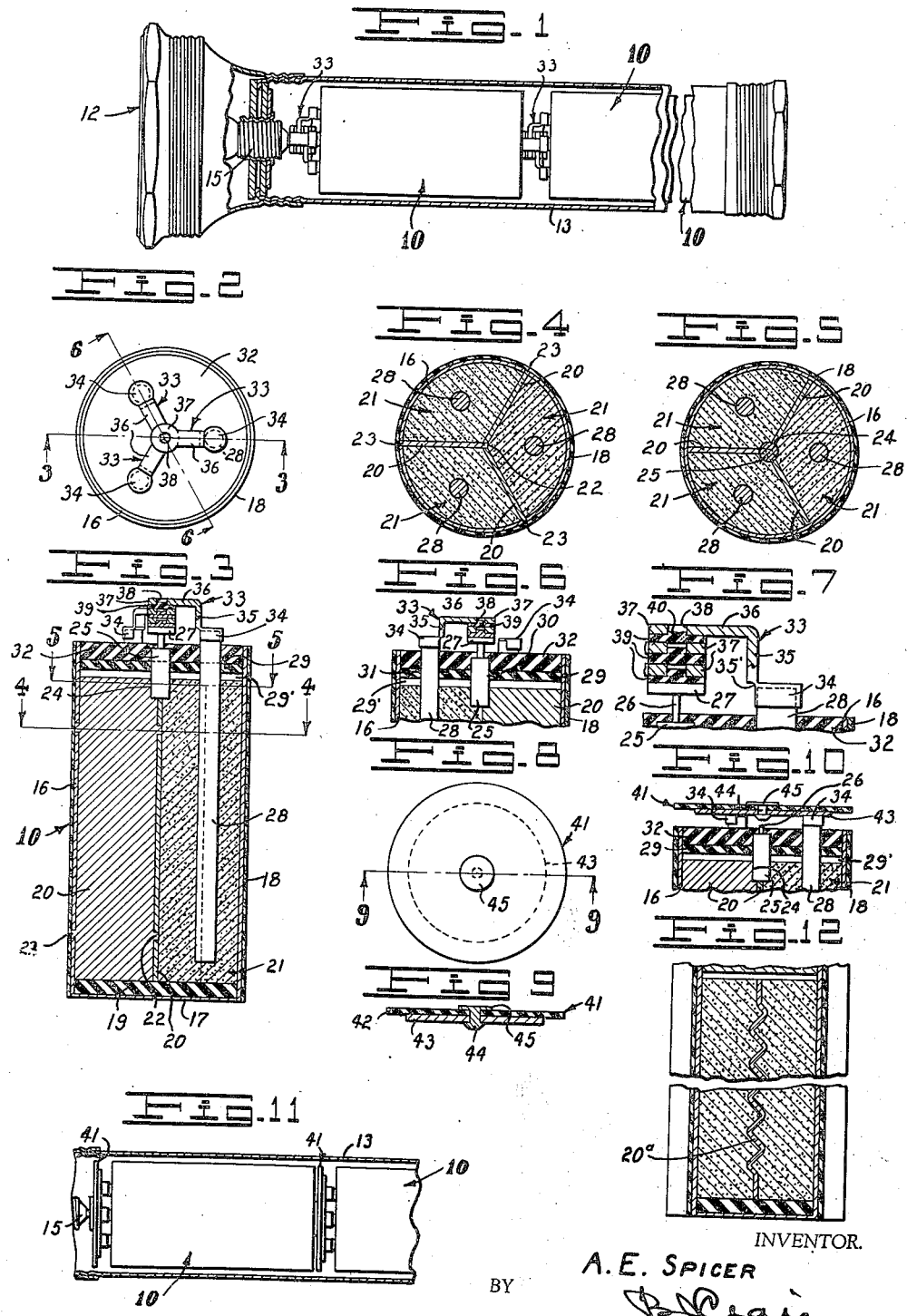
INVENTOR.
A. E. SPICER
BY
ATTORNEY.

Patented Jan. 2, 1940

2,185,756

UNITED STATES PATENT OFFICE 2,185,756

MULTIPLE CELL DRY BATTERY

Arthur E. Spicer, Pasadena, Calif.

Application September 19, 1938, Serial No. 230,592

3 Claims. (Cl. 136—108)

This invention relates to improvements in dry cell batteries.

The general object of the invention is to provide an improved dry cell.

A more specific object of the invention is to provide an improved, multiple cell dry battery including a plurality of positive poles within one case.

Another object is to provide a multiple cell for supplying current from one or all the positive poles at one time.

Another object of the invention is to provide an improved dry cell including a novel terminal member.

Other objects and the advantages of this invention will be apparent from the following description taken in connection with the accompanying drawing, wherein:

Fig. 1 is a side elevation, partly broken away, showing a flashlight case with a plurality of my improved dry cell batteries operatively positioned therein;

Fig. 2 is a top plan view of my improved dry cell battery;

Fig. 3 is a section taken on line 3—3 of Fig. 2;

Fig. 4 is a section taken on line 4—4 Fig. 3;

Fig. 5 is a section taken on line 5—5 Fig. 3;

Fig. 6 is a fragmentary section taken on line 6—6 Fig. 2;

Fig. 7 is an enlarged fragmentary section similar to Fig. 3;

Fig. 8 is a top plan view of the insulated contact disk;

Fig. 9 is a section taken on line 9—9 Fig. 8;

Fig. 10 is a fragmentary central sectional view of the contact disk positioned on a dry cell;

Fig. 11 is a central sectional view of a flashlight case showing my improved dry cell and contact disk in place; and Fig. 12 is a fragmentary section of a dry cell shown with a modified partition member therein.

Referring to the drawing by reference characters I have indicated my improved dry cell battery generally at 10. In Fig. 1 I have shown a plurality of the batteries 10 operatively positioned in a flashlight 12 which includes the usual hollow casing 13 having an electric light bulb 15 therein adjacent one end the center contact of which is adapted to be engaged by the positive pole of a dry cell battery.

As shown the battery 10 includes a cylindrical zinc outer casing 16 which is open at the top and closed at the opposite end by an integral bottom 17. The casing 16 is preferably encased in a heavy paper or cardboard cover 18. Within the casing 16 and engaging the bottom 17 I provide a disk of insulation material 19 such as heavy cardboard or fiber.

Within the casing 16 above the insulation disk 19 I provide a plurality of longitudinal metal partitions 20 which are shown as three in number and form three separate chambers or cells indicated at 21.

Each of the partitions 20 engages the insulation disk 19 and extends toward the open end of the casing where they terminate a predetermined distance below the end of the casing. The partitions 20 may be secured together by any desired means such as by tongues 22 positioned in suitable slots provided therefor in the adjacent partition.

Furthermore each of the partitions may be secured to the casing 16 by any desired means as by tongues 23 positioned in suitable apertures in the casing.

Adjacent the upper ends of the partitions 20 and at their junctures the partitions are notched as at 24 to receive a metal plug 25. The plug 25 extends upwardly to slightly below the end of the casing 16 where it includes a reduced portion 26 which extends above the end of the casing 16 where it includes an enlarged head 27.

Centrally located within each of the cells 21 I provide a carbon bar 28 each of which forms the positive pole for its particular cell. The outer ends of the bars 28 extend a predetermined distance beyond the open end of the casing 16. Each of the cells 21 is filled with a suitable dry cell electrolyte after which a disk of insulation material 29 such as cardboard or fiber is positioned within the casing 16 over the ends of the partitions 20 and spaced above the electrolyte to provide a gas space 29'.

The disk 29 is suitably apertured as at 30 to receive the plug 25 and as at 31 to receive the bars 28.

The space in the casing 16 above the insulation disk 29 is filled with suitable sealing wax 32 to a level with the end of the casing.

Positioned on each of the bars 28 I provide a contact finger indicated at 33. As shown each of the contact fingers 33 include a cupped portion 34 which fits over one of the bars 28, a vertical portion 35 extending upward from one side of the cupped portion and a horizontal portion 36 extending from the vertical portion on the side opposite to the cupped portion. A thin portion 35' at the juncture of the portions 34 and 35 allows easy separation of the portions 34 and 35.

The portion 36 extends towards the axis of the battery and terminates in an enlarged circular head 37 having an aperture 38 therein. The horizontal portions 36 are each spaced a different distance from the end of the battery so that the heads 37 thereof may all be positioned in line with the plug 25 with a space therebetween.

Each of the head portions 37 has a washer 39 made of a suitable insulation material engaging the under face thereof with a reduced portion 40 of the washer positioned in the aperture 38. The washers 39 form insulated spacers between the heads 37 of the contact fingers 33 and between the lowermost head 37 and the plug head 27 upon which they rest.

In operation a battery 10 is positioned in the flashlight casing 13 with the uppermost contact finger head 37 engaging the center contact of the bulb 15 with the bottom 17 of the casing 16 grounded to the casing 13 and with a circuit to a switch in the usual manner. When two of the batteries 10 are used as shown in Fig. 1 the uppermost contact finger head 37 engages the bottom 17 of the first battery 10 and the bottom 17 of the second battery is grounded to the flashlight casing.

When the cell 21 associated with the uppermost contact finger 33 becomes weak or exhausted the operator removes the battery from the flashlight and by tearing across the portion 35' removes the uppermost contact finger 33 and its associated insulation disk 39 thereby exposing the head 37 of the second contact finger 33.

When the cell 21 associated with the second contact finger 33 becomes weak or exhausted the operator removes the second contact finger and its associated disk 39 and when the cell 21 associated with the third or lowermost contact finger 33 becomes weak the operator removes the third contact finger.

After the third or last contact finger 33 is removed the operator breaks the weakened stem 26 of the plug 25 and removes the head 27.

As shown in Figs. 10 and 11 a connector disk 41 is then used to connect all of the bars 28. The connector disk 41 comprises a disk 42 made of insulation material and a reduced metal disk 43 which is secured to the disk 42 by a metal rivet 44 having an enlarged head 45 thereon on the side opposite the metal disk 43.

The connector 41 is placed on the battery 10 with the metal disk 43 engaging all of the bars 28. When the battery is positioned in the flashlight the enlarged head 45 of the rivet 44 engages the center contact of the bulb 15 thus current may be drawn from all three of the cells 21.

If desired the partition member may be corrugated as shown at 20a in Fig. 12 to increase the electrolyte surface.

The positive side of the battery preferably consists of a carbon rod which is packed about with coke, charcoal manganese dioxide and minute particles of pure tin dust which help to cut down the internal resistance due to the hydrogen bubbles which form a layer separating the carbon from the electrolyte. The negative partition and case is pure zinc with an electrolyte between it and the positive bar. The electrolyte preferably consists of saline clay, minute particles of mercury, sal ammoniac, zinc chloride and plaster of Paris in suitable proportions and with a chromium coating if desired in all or a part of the zinc.

Although I have shown and described my invention as combined to form a flashlight battery it will be understood that the invention is applicable to any type of dry cell or similar battery.

From the foregoing description it will be apparent that I have provided a novel dry cell battery which is simple in construction and highly efficient in use.

Having thus described my invention I claim:

1. In a dry battery, an electroactive metal case, a plurality of cells formed by said case, an electrolytic material in each of said cells, an electroactive rod in the electrolytic material in each cell and spaced from the case, said rods protruding from the casing at one end and each having a friable terminal secured to the projecting end thereof, said terminals including portions converging towards a common line which is parallel to said rods, said terminals having end portions which are aligned in said line, and removable insulation material secured between the aligned end portions of the terminals.

2. In a dry battery, an electroactive metallic housing, partitions in said housing forming a plurality of independent cells, an independent positive post in each cell and projecting therefrom, said posts being spaced apart, a support post on the housing, a friable terminal secured to each of the positive posts, said terminals converging towards the support post and including end portions which are superimposed above the support post, and removable insulating material between the support post and the lowermost terminal end portion and between the terminal end portions.

3. A dry battery including an elongated zinc housing, partitions in said housing forming a plurality of elongated independent cells, a closure for the top of said housing, an independent positive post in each cell, each of said posts including a projecting portion extending through said closure, said posts being spaced apart, a supporting post common to all of said cells, said last mentioned post projecting above said closure, a metal contact member on each of said independent posts, the contact member on each cell including an upwardly extending portion and an inwardly extending portion, said inwardly extending portions converging towards the supporting post with the end portions aligned above the supporting post and removable insulating material between each of said contacts and between the common post and the adjacent contact, said contacts each including a weakened portion and said supporting post including a weakened portion.

ARTHUR E. SPICER.